(12) United States Patent
Minshull

(10) Patent No.: US 11,252,951 B1
(45) Date of Patent: Feb. 22, 2022

(54) EYED IMPLEMENT HOLDING SYSTEM

(71) Applicant: Warren Evans Minshull, Gulf Breeze, FL (US)

(72) Inventor: Warren Evans Minshull, Gulf Breeze, FL (US)

( * ) Notice: Subject to any disclaimer, the term of this patent is extended or adjusted under 35 U.S.C. 154(b) by 556 days.

(21) Appl. No.: 16/120,271

(22) Filed: Sep. 2, 2018

Related U.S. Application Data

(63) Continuation-in-part of application No. 15/017,641, filed on Feb. 7, 2016, now Pat. No. 10,064,401.

(51) Int. Cl.
    *A01K 97/06*     (2006.01)

(52) U.S. Cl.
    CPC .................... *A01K 97/06* (2013.01)

(58) Field of Classification Search
    CPC ............................... A01K 97/06; B65D 85/24
    USPC ........... 43/57.1, 54.1, 57.2; 206/315.11, 380; 224/920
    See application file for complete search history.

(56) References Cited

U.S. PATENT DOCUMENTS

| | | | | |
|---|---|---|---|---|
| 652,901 A | * | 7/1900 | Roeber | B65D 83/0472 221/71 |
| 726,509 A | * | 4/1903 | Connor | A01K 97/06 43/57.1 |
| 940,132 A | * | 11/1909 | Creasey | A01K 97/06 43/57.1 |
| 1,779,343 A | * | 10/1930 | Sylvanne | A01K 91/03 24/600.4 |
| 1,824,481 A | * | 9/1931 | Hazlitt | A01K 97/06 43/57.1 |
| 2,222,096 A | * | 11/1940 | Walthour, Jr. | A01K 97/06 43/57.1 |
| 2,232,873 A | * | 2/1941 | Storms | B65D 5/5059 223/107 |
| 2,235,914 A | * | 3/1941 | Beck | A01K 97/06 43/57.1 |
| 2,268,920 A | * | 1/1942 | Baumgartner | A01K 97/06 43/57.1 |

(Continued)

FOREIGN PATENT DOCUMENTS

| | | | | |
|---|---|---|---|---|
| EP | 0317328 A1 | * | 5/1989 | ............. A01K 91/00 |
| FR | 2578716 A1 | * | 9/1986 | ............. A01K 97/06 |

(Continued)

OTHER PUBLICATIONS

Translation of JP 2006-345763 (Year: 2006).*

*Primary Examiner* — Darren W Ark
(74) *Attorney, Agent, or Firm* — Peter Loffler

(57) ABSTRACT

A holding system for fishing hooks and other items having an eye, such as a needle, is formed from a flexible and resilient first section of line that is formed into an infinite loop having a large loop having a bulbous portion in its relaxed state, and a small loop, each on either side of a crimped sleeve. The held items are fed onto the line via each item's eye and the items held between the bulbous portion and the sleeve such that the bulbous portion prevents the items' discharge from the line. When the bulbous portion is squeezed, it becomes flattened allowing the items to slide off of the large loop in orderly fashion. When the bulbous portion is no longer squeezed, it resiliently returns back to its bulbous state. A second section of line can coextend with the small loop and be held by the sleeve.

5 Claims, 4 Drawing Sheets

(56) References Cited

U.S. PATENT DOCUMENTS

| | | | | |
|---|---|---|---|---|
| 2,422,870 A * | 6/1947 | Willis | A01K 97/06 43/57.2 |
| 2,430,115 A * | 11/1947 | Hickson | A01K 97/16 43/42.74 |
| 2,541,920 A * | 2/1951 | Hammock | A01K 91/18 43/57.3 |
| 2,614,359 A * | 10/1952 | Galbraith | A01K 97/06 43/57.1 |
| 2,682,126 A * | 6/1954 | Shepherd | A01K 91/04 269/254 CS |
| 2,804,716 A * | 9/1957 | Adkison | A01K 91/18 43/57.3 |
| 2,838,868 A * | 6/1958 | Young | A42B 1/24 43/57.2 |
| 2,904,925 A * | 9/1959 | Clark | B65D 75/38 43/57.1 |
| 3,004,319 A * | 10/1961 | Hennon | A01K 97/06 24/598.5 |
| 3,005,574 A * | 10/1961 | Lovell | A01K 97/06 221/310 |
| 3,122,854 A * | 3/1964 | Boertlein, Sr. | A01K 97/06 43/57.1 |
| 3,180,487 A * | 4/1965 | Uddenborg | B65D 85/24 206/227 |
| 3,206,068 A * | 9/1965 | McQuillin | A01K 97/06 221/307 |
| 4,034,850 A * | 7/1977 | Mandel | A61B 17/06138 206/63.3 |
| 4,179,834 A * | 12/1979 | Thomas | A01K 97/06 43/57.2 |
| 4,326,630 A * | 4/1982 | Bacino | A61B 17/06133 206/315.11 |
| 4,424,898 A * | 1/1984 | Thyen | A61B 17/06133 206/63.3 |
| 4,546,569 A * | 10/1985 | Thompson, Jr. | A01K 91/18 43/57.3 |
| 4,577,433 A * | 3/1986 | Jones | A01K 97/06 43/57.2 |
| 4,802,581 A * | 2/1989 | Takahashi | B65D 83/02 206/380 |
| 5,438,791 A * | 8/1995 | Sherrod | A01K 97/06 43/57.1 |
| 5,524,385 A * | 6/1996 | Longo | A01K 83/00 43/43.16 |
| 5,806,236 A * | 9/1998 | Lloyd | A01K 97/06 43/57.1 |
| 5,875,585 A * | 3/1999 | Schreifels | A01K 91/14 43/44.98 |
| 6,036,051 A * | 3/2000 | Benjamin | A01K 97/06 221/185 |
| 6,889,469 B1 * | 5/2005 | Chung | A01K 97/06 43/57.1 |
| 7,159,356 B2 * | 1/2007 | Westcott | A01K 97/06 43/25.2 |
| 7,380,367 B1 * | 6/2008 | Andrews | A01K 97/06 43/57.1 |
| 7,513,076 B1 * | 4/2009 | Gehrts | A01K 97/06 206/315.11 |
| 7,900,392 B2 * | 3/2011 | Musto | A01K 97/06 43/54.1 |
| D715,134 S * | 10/2014 | Wells | A01K 97/06 D8/370 |
| 10,064,401 B1 * | 9/2018 | Minshull | A01K 97/06 |
| 2007/0051032 A1 * | 3/2007 | Moffitt | A01K 97/06 43/54.1 |
| 2013/0008076 A1 * | 1/2013 | Stenklyft | A01K 97/06 43/44.83 |
| 2015/0143739 A1 * | 5/2015 | Wells | A44B 15/005 43/44.98 |
| 2015/0305314 A1 * | 10/2015 | Rohrer | A01K 89/081 43/20 |
| 2021/0084877 A1 * | 3/2021 | Ogarrio | A01K 97/06 |

FOREIGN PATENT DOCUMENTS

| | | | | |
|---|---|---|---|---|
| GB | 331741 A * | 7/1930 | A01K 97/06 |
| GB | 945377 A * | 12/1963 | A01K 91/04 |
| GB | 2187721 A * | 9/1987 | A01K 97/06 |
| GB | 2274966 A * | 8/1994 | A01K 97/06 |
| JP | H0534874 U | 5/1993 | |
| JP | 08023848 A * | 1/1996 | |
| JP | 08047360 A * | 2/1996 | |
| JP | 09056315 A * | 3/1997 | |
| JP | 09224535 A * | 9/1997 | |
| JP | 09275869 A * | 10/1997 | |
| JP | 09294509 A * | 11/1997 | |
| JP | 10140408 A * | 5/1998 | |
| JP | 10229797 A * | 9/1998 | |
| JP | 11266765 A * | 10/1999 | |
| JP | 2001247138 A * | 9/2001 | |
| JP | 2002125556 A * | 5/2002 | |
| JP | 2003023941 A * | 1/2003 | |
| JP | 2003250411 A * | 9/2003 | |
| JP | 2004313067 A * | 11/2004 | |
| JP | 2005065584 A * | 3/2005 | |
| JP | 2005104571 A * | 4/2005 | |
| JP | 2005185136 A * | 7/2005 | |
| JP | 2006034203 A * | 2/2006 | |
| JP | 2006180858 A * | 7/2006 | |
| JP | 2006345763 A * | 12/2006 | |
| JP | 2007061040 A * | 3/2007 | |
| JP | 2007289072 A * | 11/2007 | |
| JP | 2008306971 A * | 12/2008 | |
| JP | 2010252717 A * | 11/2010 | |
| KR | 20130002595 U * | 5/2013 | |
| WO | WO-03063627 A1 * | 8/2003 | A01K 97/06 |
| WO | WO-2011092925 A1 * | 8/2011 | B65D 5/5023 |

\* cited by examiner

EYED IMPLEMENT HOLDING SYSTEM

This application is a Continuation-In-Part of U.S., patent application Ser. No. 15/017,641, filed on Feb. 7, 2016, which application is incorporated herein by reference in its entirety.

BACKGROUND OF THE INVENTION

1. Field of the Invention

The present invention relates to a holding system that holds eyed implements such as hooks, swivels, sewing needles, knitting needles, etc., in an orderly linear manner and assists in threading the eye of the hook onto its appropriate line whenever an eyed implement is retrieved from the holding system.

2. Background of the Prior Art

Fishing is one of life's great past times. Jump into a boat or sit on a dock or simply a shoreline, cast a line, and wait for dinner to come biting, all while enjoying a beer or other refreshment. It simply does not get much better than that, adding support to the old saying that a bad day at fishing is better than a good day at work.

One of the main paraphernalia items used during fishing is the old fashioned hook. The hook has an eyelet end which is attached to the fishing rod's line and a barbed or hooked end that is used to hook the fish that comes biting for the bait on the hook. Fishing hooks run the gamut from the simple to the elaborate, but they all have one trait in common, the hooked end is very sharp and very painful if it hooks a person on a body part. Hooks may be sold individually or in multipacks, often loosely packed together in plastic containers or bags, and irrespective of how they are sold, many fishermen simply throw a bunch of them into a container and retrieve one as each is needed.

When the fishing hooks are lumped in a container, which can be anything from a used medication container, to a Tupperware tub, to a tool box, the hooks tend to get jumbled about, often becoming entangled with one another. When a person seeks to retrieve a hook, the person must often untangle a desired hook from the tangled lump of fishing hooks. Even the most careful of fishermen will get stuck with a hook from time to time, adding a rousing dose of pain to the fishing experience.

To address this problem, many fishermen package each hook individually, such as by placing a single hook into a small container and then placing a multitude of such small containers into a larger container or alternately, using a storage box with multiple individual compartments with a single hook being placed into each compartment. While each system is effective in reducing the potential for being painfully hooked, these methods of hook storage often takes up too much of the limited storage space a person has for all of the needed supplies for the day. Additionally, this method is time-consuming to implement and many fishermen simply take their chances and simply hope the day's blood draw is kept to a minimum.

What is needed is a device that holds a plurality of fishing hooks in a neat and orderly manner so as to allow a user to be able to retrieve a single hook for use without fear of the user getting hooked. Such a device must be of relatively simple design and construction and must be compact in its footprint.

SUMMARY OF THE INVENTION

The eyed implement holding system of the present invention addresses the aforementioned needs in the art by providing a device that holds a plurality of fishing hooks (or other eyed implements such as swivels, sewing needles, knitting needles, etc.,) in a neat and orderly fashion and prevents the hooks from becoming entangled with one another. The eyed implement holding system allows a user to dispense a single hook with minimum fear of being hooked by the hooks being held by the device with the added benefit of the device assisting the user in threading the hook onto the end of a fishing line (or other appropriate line depending on the nature of the implement being held). Retrieval of fishing hooks from the eyed implement holding system is relatively simple. The eyed implement holding system is of relatively simple design and construction, being produced using standard manufacturing techniques, so as to make the device relatively inexpensive to produce so as to be economically attractive to potential consumers for this type of device. The present invention is compact in its footprint so as to not unduly adversely impact on the limited storage space often available to fishermen.

The eyed implement holding system of the present invention is comprised of a flexible and resilient first line formed into an infinite loop, such that a crimped sleeve crimps two points of the first line together to thereby form the infinite loop (the two ends of the line and a second point medially along the line) and also to divide the infinite loop into a large loop having a bulbous portion with a distal end on one side on the crimped sleeve and a relatively smaller small loop on an opposite side of the crimped sleeve. The bulbous portion of the large loop articulates between two states, a normally relaxed state wherein the bulbous portion forms a bulbous loop having a first cross section and a flattened state wherein the bulbous portion is flattened and has a second cross section whenever a squeezing force is placed onto the bulbous portion. Whenever the squeezing force is removed from the bulbous portion when the bulbous portion is in the flattened state, the bulbous portion resiliently returns to the normally relaxed state, once again forming the bulbous loop. The large loop is threaded through the eye of the implement so that the implement is slid along the large loop and is positioned between the bulbous loop and the crimped sleeve—of course the eyed implements can be threaded onto the device during infinite loop formation via the crimped sleeve. The eye of the hook has a third cross section that is greater relative to the second cross section and smaller relative to the first cross section such that whenever the bulbous portion is in the relaxed state and forms the bulbous loop, the eye is unable to pass along the bulbous loop and is maintained between the bulbous loop and the crimped sleeve. Whenever the bulbous portion is in the flattened state, the eye slides along the flatted bulbous loop and is unthreaded from the large loop. The first line is made from either a monofilament material or from a shape metal alloy or from a braided wire or line or other similar material. A second section of line coextends with the small loop and be crimped to the small loop via the crimped sleeve.

BRIEF DESCRIPTION OF THE DRAWINGS

Similar reference numerals refer to similar parts throughout the several views of the drawings.

DESCRIPTION OF THE PREFERRED EMBODIMENT

Figure 3:
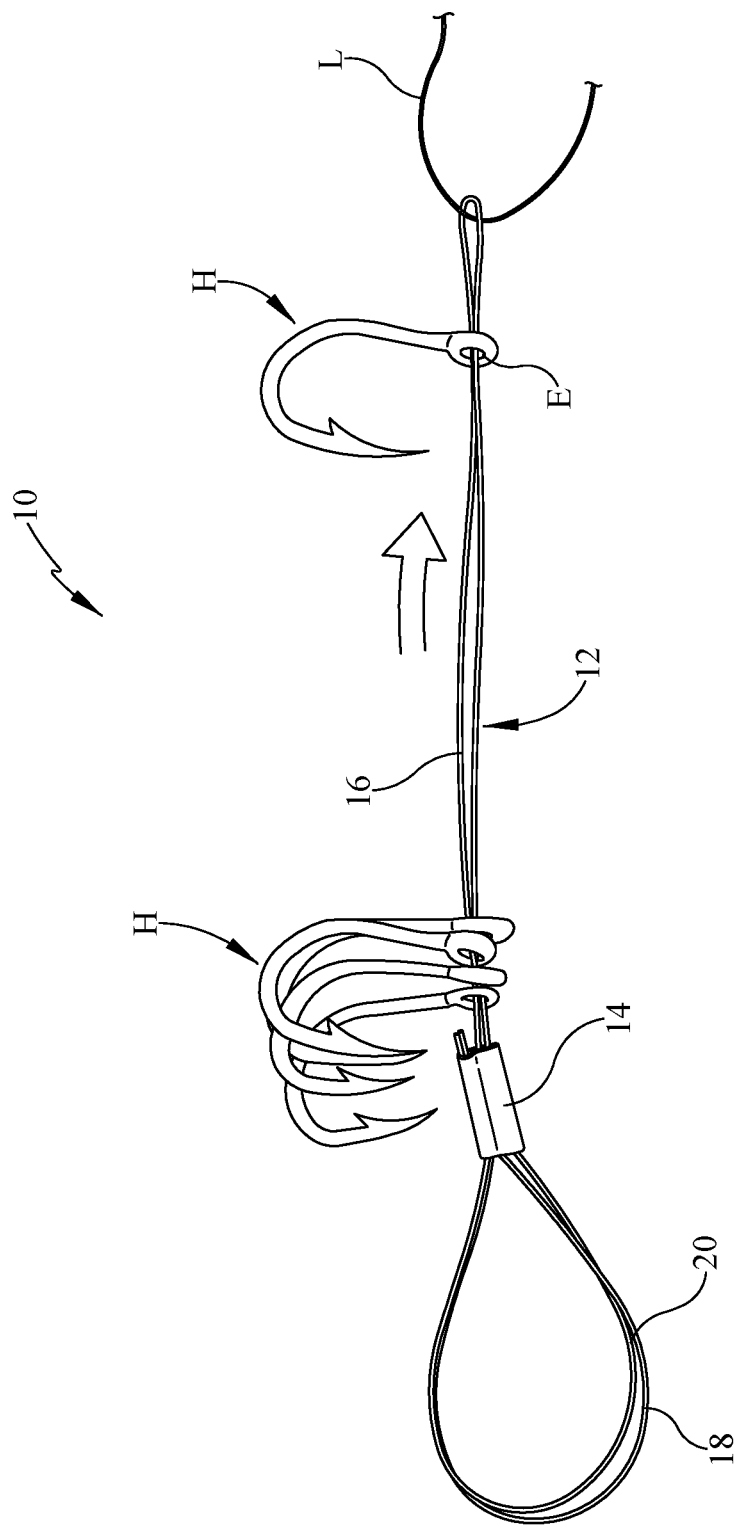
FIG. 3 is a perspective view of the eyed implement holding system at the commencement of the dispensing process wherein a hook is threaded onto fishing line.

Referring now to the drawings, it is seen that the eyed implement holding system of the present invention, generally denoted by reference numeral 10, is comprised of a first section of line 12 that is formed into an infinite loop via a crimped sleeve 14 (the two ends of the first section of line 12 held within the crimped sleeve 14 against a point medially along the length of the line 12) that crimps the first section of line 12 into a large loop 16 having a relatively large bulbous portion on one side of the crimped sleeve 14 and a relatively smaller small loop 18 on the opposing side of the crimped sleeve 14, the crimped sleeve crimped thereon with sufficient force so as to hold the two loops 16 and 18 firmly in place. The line 12 is made from a flexible and resilient material, such as monofilament line, spring-shape alloy, braided line or wire, etc. When the large loop 16 loop is squeezed together, the bulbous portion of the large loop 16 flattens out as best seen in FIG. 3. When the flattened bulbous portion of the large loop 16 is no longer being squeezed, the bulbous portion resiliently returns to its normally relaxed state of being bulbous and not flattened.

While the small loop 18 may also be similarly squeezed and flattened and then resiliently returned to its bulbous state (albeit smaller relative to the large loop 16), the main purpose of the small loop 18 is to act as a handle or finger grab for ease of use of the eyed implement holding system 10. As seen, a second section of line 20, made from the same or similar material used to make the first section of line 12, can coextend with the small loop 18 and be crimped to the small loop 18 via the crimped sleeve 14 in order to increase the overall thickness of the finger grab for comfort of use. Alternately, or in addition, the small loop 18 (and the second section of line 20, if used), can have an appropriate plastic or rubber coating thereon for added comfort for the user.

In order to use the eyed implement holding system 10 of the present invention, a user grasps the eyed implement holding system 10 via a finger that is passed through the small loop 18 acting as a finger grab and one or more hooks H are fed onto the large loop 16 by squeezing the large loop 16 in order to flatten it out. When the large loop 16 is flattened out, such as via squeezing between a person's fingers, the hooks H are fed onto the large loop 16 by passing the flattened large loop 16 through the eye E of each hook H. Once all hooks H are fed onto the large loop 16, the squeezing of the large loop 16 is terminated, and the large loop 16 springs back to its normally relaxed bulbous state—of course, the eyes E of the hooks H can be fed through the two ends of the line 12 prior to forming the infinite loop. The hooks H are now secure on the large loop 16 and will not come off as the bulbous loop portion of the large loop 16 is wider relative to the opening of the eye E of the hook H. If the hook H is slid down toward and onto the bulbous portion of the large loop 16, the hook H lacks sufficient mass to squeeze the bulbous portion of the large loop 16 together a sufficient amount to flatten out the large loop 16 so as to let the hook H pass over the bulbous loop. However, when a user pulls on the hook H, the user is able to put sufficient pulling force onto the hook H so as to flatten out the bulbous portion of the large loop 16 to the point that the hook H is able to slide off of the large loop 16. Once the hook H is removed off of the large loop 16, the squeezing force is no longer present on the bulbous portion and the bulbous portion returns to its normally relaxed bulbous loop state, preventing the remaining hooks H from coming off of the large loop 16.

Figure 4:
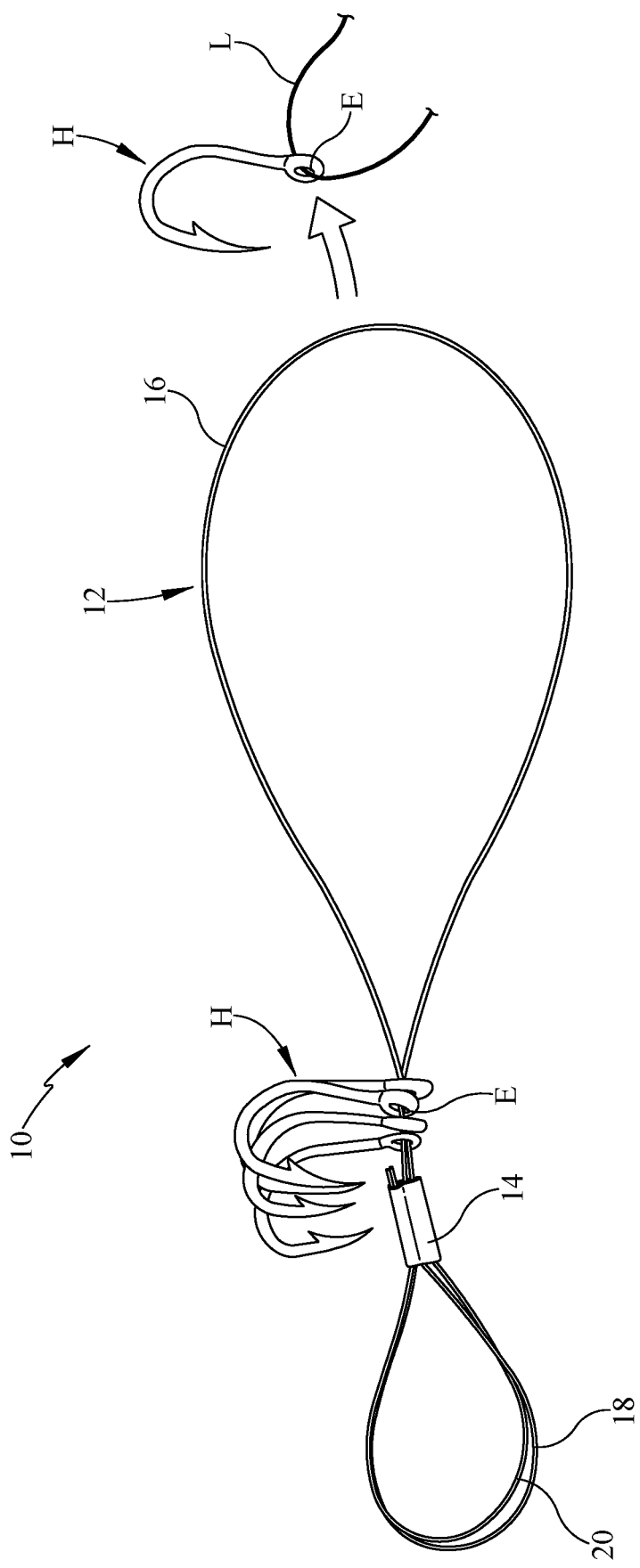
FIG. 4 is a perspective view of the eyed implement holding system after dispensing of the hook onto the fishing line.

As seen in FIGS. 3 and 4, when the bulbous portion of the large loop 16 is flattened, the flattened bulbous portion can act as a line guide so that the end of a fishing line L is placed through the flattened bulbous portion proximate its distal end, the distal end being used as a guide to guide the line L into the eye E of the hook H. When the hook H is fully removed from the bulbous portion of the large loop 16, the hook H is already threaded onto the fishing line L, ready for securement thereon.

Figure 1:
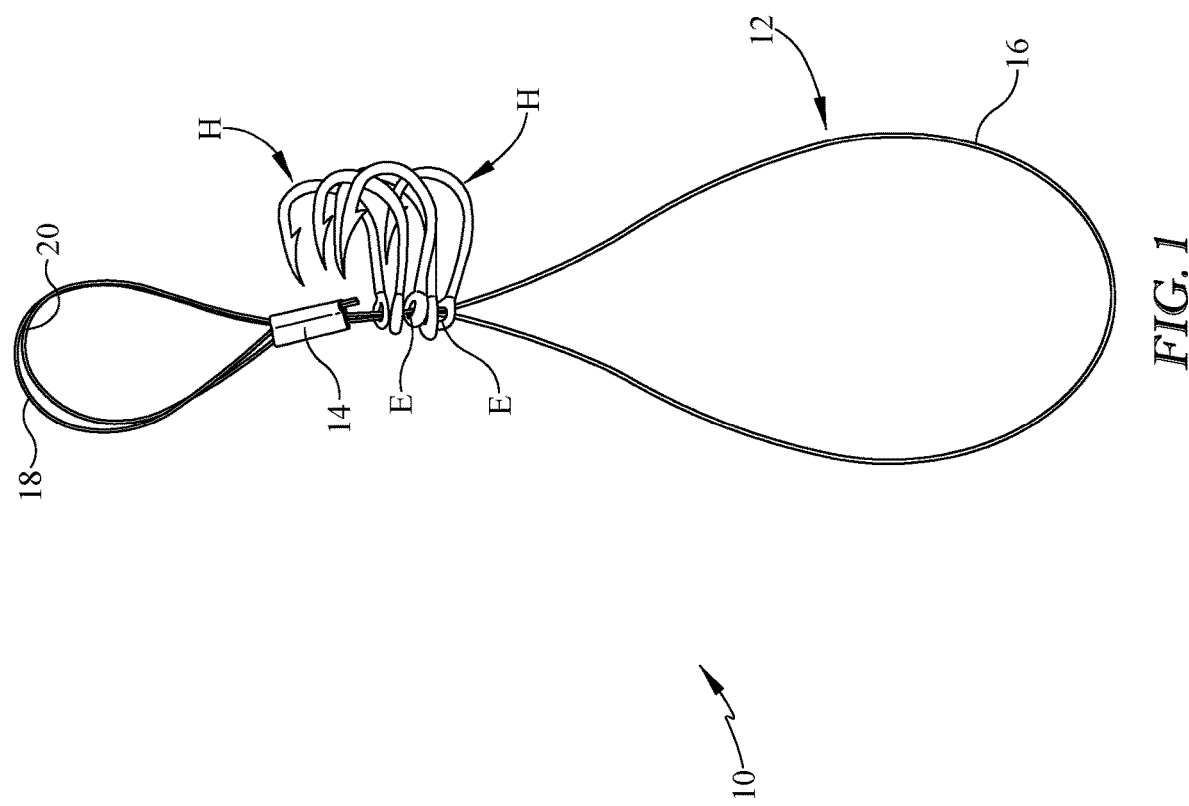
FIG. 1 is perspective view of the eyed implement holding system of the present invention.
Figure 2:
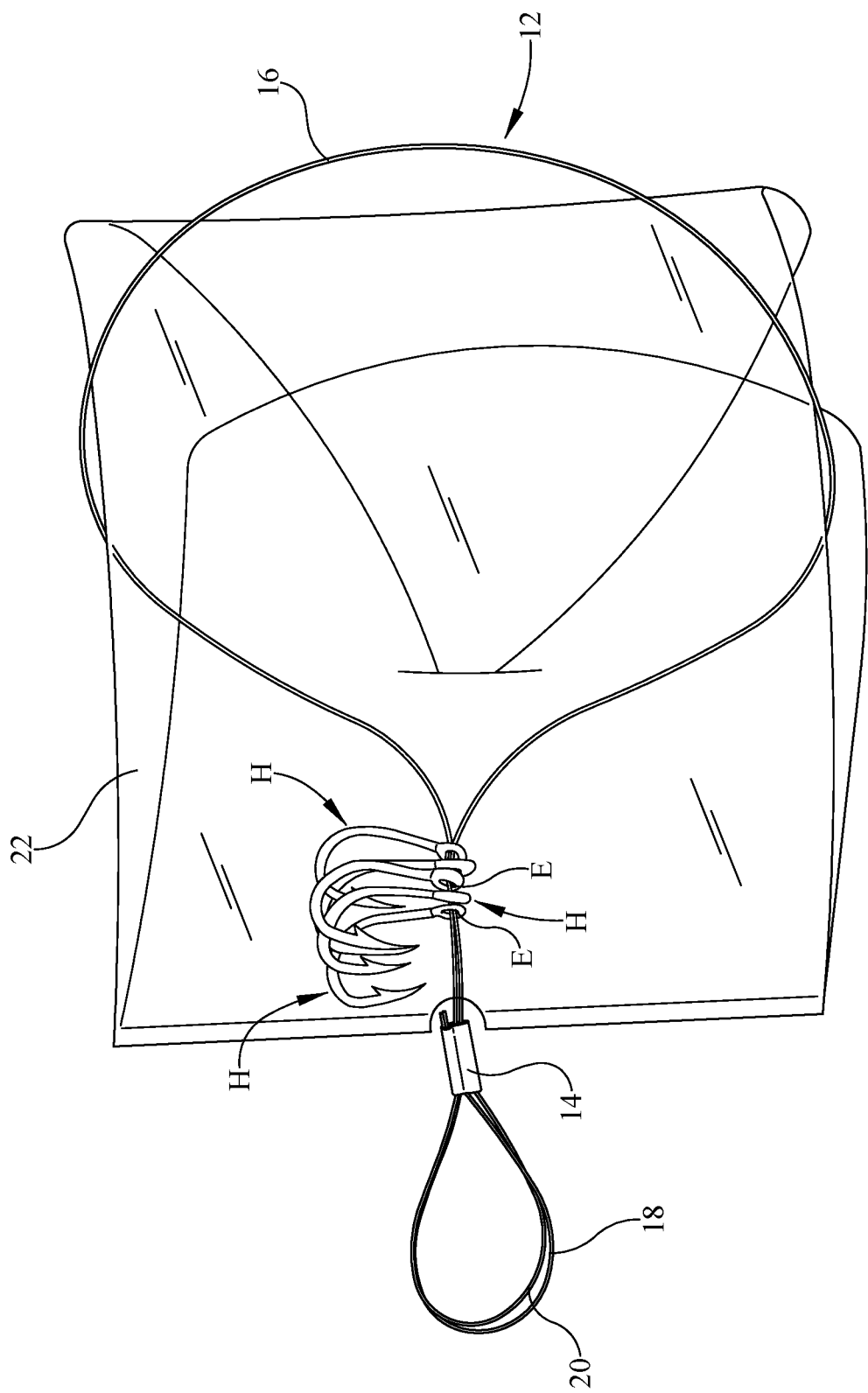
FIG. 2 is a perspective view of the eyed implement holding system within a protective package.

The eyed implement holding system 10 allows for simple, compact, and orderly storage of a plurality of fishing hooks H and even with a full complement of hooks H resident on the large loop 16, the entire device is relatively flat, allowing for easy storage with the remainder of the user's items. Of course, the eyed implement holding system 10 can be used to hold other devices that have eyes including, swivels sewing needles, knitting needles, etc. As seen in FIG. 2, the entire holding system 10, hooks H and all, can be stored in an appropriate protective package 22 if desired.

While the invention has been particularly shown and described with reference to an embodiment thereof, it will be appreciated by those skilled in the art that various changes in form and detail may be made without departing from the spirit and scope of the invention.

I claim:

1. A holder for holding an implement having an eye in combination with the implement, the holder comprising:
    a flexible and resilient first line formed as an infinite loop such that a crimped sleeve crimps two points of the first line together thereby forming a large loop having a bulbous portion with a distal end and a small loop, the large loop extending from a first side of the crimped sleeve and the small loop extending from an opposing second side of the crimped sleeve such that the bulbous portion articulates between two states, a normally relaxed state wherein the bulbous portion forms a bulbous loop having a first cross section and a flattened state wherein the bulbous loop is flattened and has a second cross section whenever a squeezing force is placed onto the bulbous portion and such that whenever the squeezing force is removed from the bulbous portion when the bulbous portion is in the flattened state, the bulbous portion resiliently returns to the normally relaxed state and such that the first line remains the infinite loop whenever the bulbous portion is in either the normally relaxed state or in the flattened state or transitioning therebetween;
    a second section of line coextending with the small loop and which is crimped to the small loop via the crimped sleeve; and
    wherein the large loop is received through the eye of the implement whenever the bulbous loop is flattened with the distal end of the bulbous portion passing through the eye of the implement so that the implement is located between the bulbous loop and the crimped sleeve, with two spaced apart line sections of the bulbous portion being within the eye of the implement, each line section of the two spaced apart line sections located on opposing sides of the distal end of the bulbous portion, and such that the eye of the implement has a third cross section that is greater relative to the second cross section and smaller relative to the first cross section such that whenever the bulbous portion is in the relaxed state and forms the bulbous loop, the eye is unable to pass along the bulbous portion and is maintained between the bulbous loop and the crimped sleeve and such that whenever the bulbous portion is in the flattened state, the eye slides along the bulbous loop that is flattened and is unthreaded from the large loop.

2. The holder as in claim 1 wherein the first line is made from a monofilament material.

3. The holder as in claim 1 wherein the first line is made from a shape metal alloy.

4. The holder as in claim 1 wherein the first line is made from a braided wire or line.

5. The holder as in claim 1 wherein the first line is made from either a monofilament material or from a shape metal alloy or from a braided wire or line.

* * * * *